(12) United States Patent
Park et al.

(10) Patent No.: US 7,320,276 B2
(45) Date of Patent: Jan. 22, 2008

(54) BREAD MAKER

(75) Inventors: Jae-ryong Park, Suwon (KR); Yong-hyun Kwon, Suwon (KR); Chul Kim, Anyang (KR); Tae-uk Lee, Suwon (KR); Han-jun Sung, Suwon (KR); Jang-woo Lee, Suwon (KR); Dong-bin Lim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 335 days.

(21) Appl. No.: 10/804,015

(22) Filed: Mar. 19, 2004

(65) Prior Publication Data

US 2004/0221730 A1 Nov. 11, 2004

(30) Foreign Application Priority Data

May 7, 2003 (KR) .................... 10-2003-0028977

(51) Int. Cl.
*A47J 37/00* (2006.01)
*A47J 43/04* (2006.01)
*A21C 1/08* (2006.01)

(52) U.S. Cl. ............... 99/348; 126/275 E; 126/275 R; 126/19 R

(58) Field of Classification Search ............. 99/348, 99/353, 391, 385, 476, 474; 126/275 R, 126/275 E, 21 A, 18 R; 366/240; 219/400, 219/756

See application file for complete search history.

(56) References Cited

U.S. PATENT DOCUMENTS

| | | | | |
|---|---|---|---|---|
| 3,270,740 A | * | 9/1966 | Koos, Jr. ............... | 126/275 R |
| 3,585,360 A | * | 6/1971 | Young et al. ............... | 219/405 |
| 4,327,274 A | * | 4/1982 | White et al. ............... | 219/757 |
| 4,824,644 A | * | 4/1989 | Cox et al. ............... | 422/300 |
| 4,870,896 A | * | 10/1989 | Asahina et al. ............... | 99/348 |
| 5,493,955 A | * | 2/1996 | Belongia et al. ............... | 99/348 |
| 5,513,557 A | | 5/1996 | Chiang | |
| 5,562,022 A | * | 10/1996 | Schmid et al. ............ | 99/421 H |
| 5,568,764 A | * | 10/1996 | Belongia et al. ............... | 99/341 |
| 5,778,766 A | * | 7/1998 | Wang ............ | 99/326 |
| 5,818,017 A | * | 10/1998 | Ye et al. ............... | 219/756 |
| 5,839,356 A | * | 11/1998 | Dornbush et al. ............ | 99/331 |
| 5,874,714 A | * | 2/1999 | Sik ............ | 219/681 |
| 5,947,009 A | | 9/1999 | Hedenberg | |

(Continued)

FOREIGN PATENT DOCUMENTS

EP 0 709 024 5/1996

(Continued)

OTHER PUBLICATIONS

European search report dated Jul. 27, 2004 (3 pp) for corresponding European Patent Application.

*Primary Examiner*—Reginald L. Alexander
(74) *Attorney, Agent, or Firm*—Staas & Halsey LLP

(57) ABSTRACT

A bread maker having an oven and a main body accommodating the oven therein, which comprises a base frame in the main body, a main frame disposed above the base frame and forming an oven compartment with a front opening, and a reinforcing member mounted to the main frame to reinforce the main frame. Accordingly, the present invention provides a bread maker in which a main body is securely and stably reinforced and noise is suppressed.

18 Claims, 3 Drawing Sheets

U.S. PATENT DOCUMENTS 5,951,907 A * 9/1999 Kang .................. 219/757
6,621,058 B1 * 9/2003 Kim .................... 219/757

FOREIGN PATENT DOCUMENTS

| | | |
|---|---|---|
| EP | 1 357 504 | 10/2003 |
| JP | 63-154118 | 6/1988 |
| JP | 64-500320 | 2/1989 |
| JP | 4-158897 | 6/1992 |
| JP | 2001-523444 | 11/2001 |
| KR | 2001-32188 | 4/2001 |
| KR | 2002-53646 | 7/2002 |
| KR | 2002-56628 | 7/2002 |
| WO | 99/25467 | 5/1999 |

* cited by examiner

BREAD MAKER

CROSS-REFERENCE TO RELATED APPLICATIONS

This application claims the benefit of Korean Patent Application No. 2003-28977, filed May 7, 2003, in the Korean Intellectual Property Office, the disclosure of which is incorporated herein by reference.

BACKGROUND OF THE INVENTION

1. Field of the Invention

An aspect of the present invention relates to a bread maker, and more particularly, to a bread maker having an improved frame structure.

2. Description of the Related Art

A conventional bread maker automatically performs a series of baking processes, which allows a user to easily and conveniently make a bread.

The conventional bread maker that comprises an oven, a main body partitioned into an oven compartment and a component compartment, a pair of kneading drums disposed parallel to each other inside the oven compartment and alternating winding and unwinding rotations, is called a vertical kneading type bread maker. Accordingly, opposite ends of a mixing bag filled with ingredients to make the bread are wound on the pair of kneading drums, respectively. In the bread maker, the mixing bag reciprocates up and down as the kneading drum rotates.

In the bread maker, the main body includes a frame forming the oven compartment, and the component compartment. The frame comprises a base frame, and a main frame disposed above the base frame forming the oven compartment with a front opening to accommodate the oven therein.

According to this configuration of the bread maker, the oven and the pair of kneading drums are combined to the main frame by a combining means such as a screw, etc., and are accommodated and are supported by the main frame. Further, the frame is required to be reinforced to strengthen the bread maker.

SUMMARY OF THE INVENTION

Accordingly, it is an aspect of the present invention to provide a bread maker having a reinforced main body.

Additional aspects and advantages of the invention will be set forth in part in the description which follows and, in part, will be obvious form the description, or may be learned by practice of the invention.

The foregoing and/or other aspects of the present invention are achieved by providing a bread maker having an oven and a main body to accommodate the oven therein. Further, the bread maker comprises a base frame in the main body, a main frame disposed above the base frame to form an oven compartment with a front opening, and a reinforcing member mounted to the main frame to reinforce the main frame.

According to an aspect of the invention, the reinforcing member supports the oven. Moreover, the reinforcing member is combined to at least one of a left, a right or a rear side of the main frame.

According to yet another aspect of the invention, the reinforcing member supports a lower part of the oven.

According to another aspect of the invention, the bread maker further comprises at least one auxiliary reinforcing member mounted to the main frame spaced from the reinforcing member.

According to an aspect of the invention, the auxiliary reinforcing member is disposed above the oven.

According to yet another aspect of the invention, the auxiliary reinforcing member is combined to one or more of the left, the right and the rear sides of the main frame.

BRIEF DESCRIPTION OF THE DRAWINGS

These and/or other aspects and advantages of the invention will become apparent, and more readily appreciated from the following description of the embodiments, taken in conjunction with the accompany drawings of which.

DETAILED DESCRIPTION OF THE PREFERRED EMBODIMENTS

Figure 1:
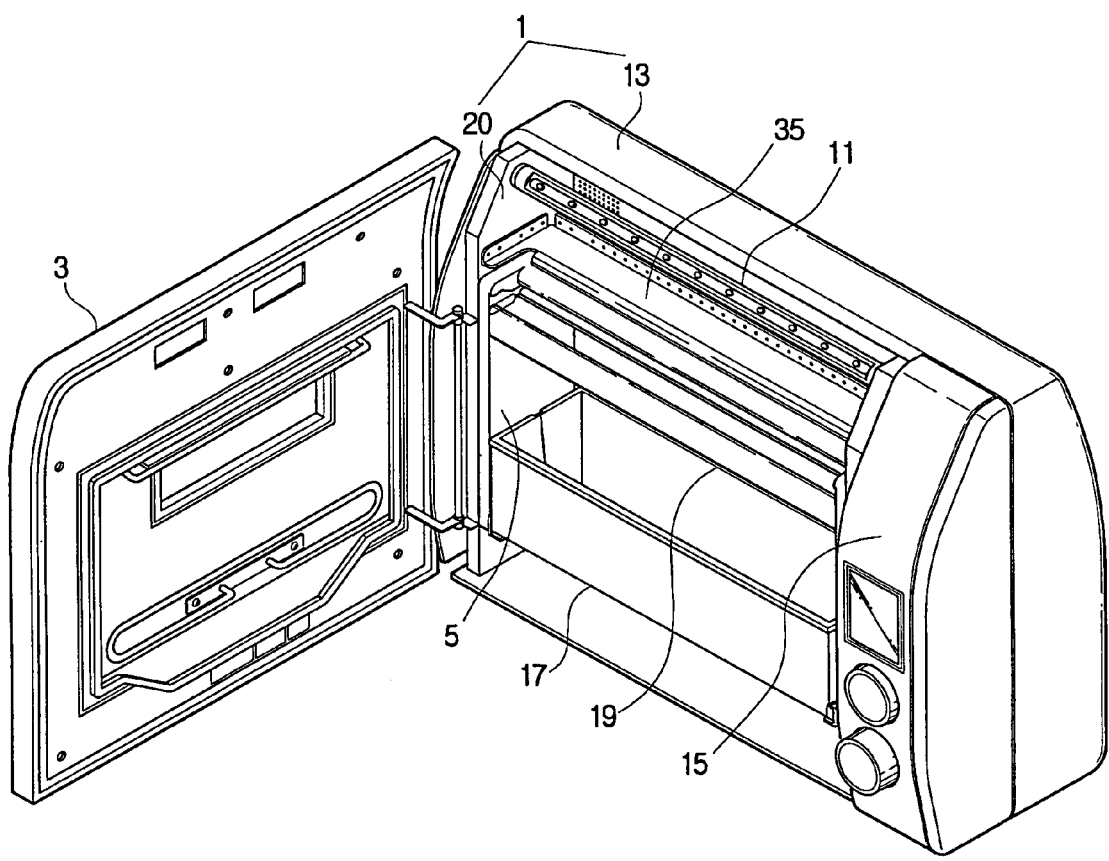
FIG. 1 is a perspective view of a bread maker.

Reference will now be made in detail to the embodiments of the present invention, examples of which are illustrated in the accompanying drawings, wherein like reference numerals refer to like elements throughout.

Figure 2:
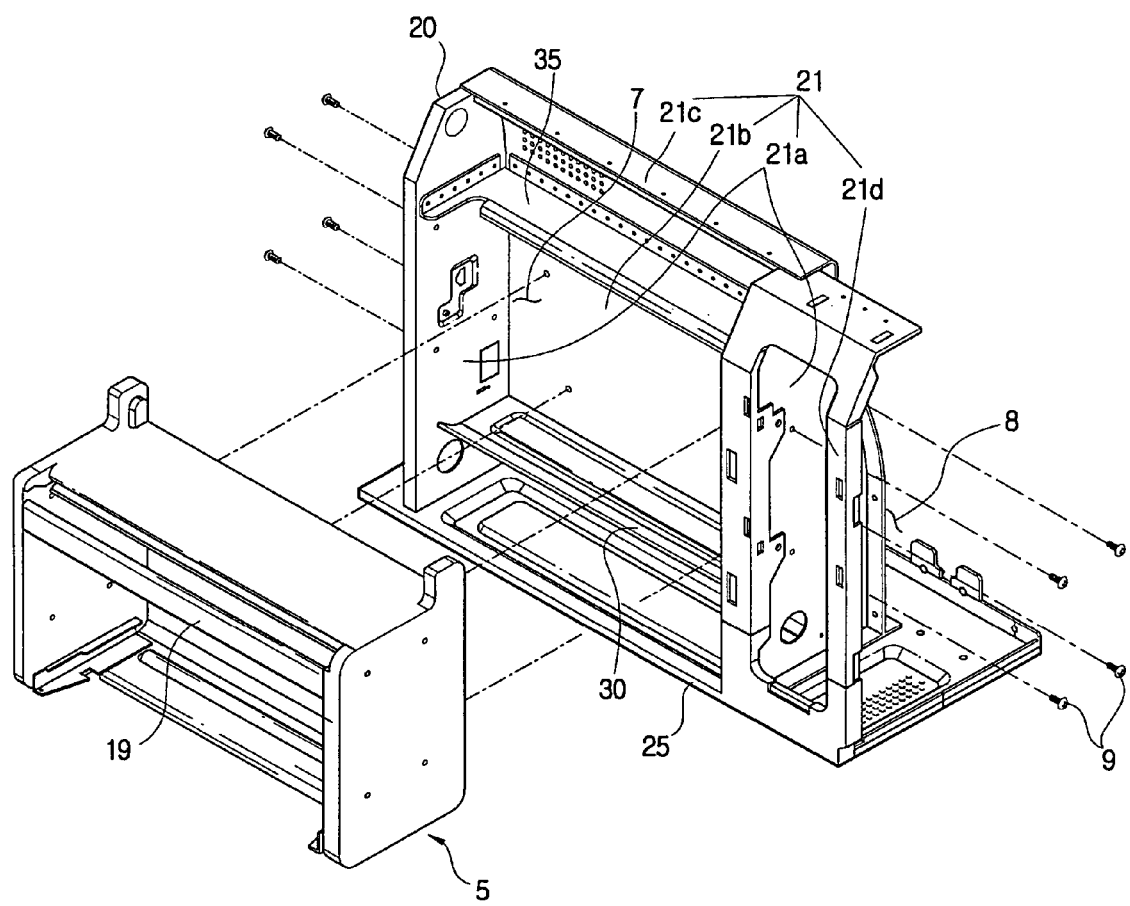
FIG. 2 is a perspective view of a frame provided to the bread maker according to an aspect of the present invention.
Figure 3:
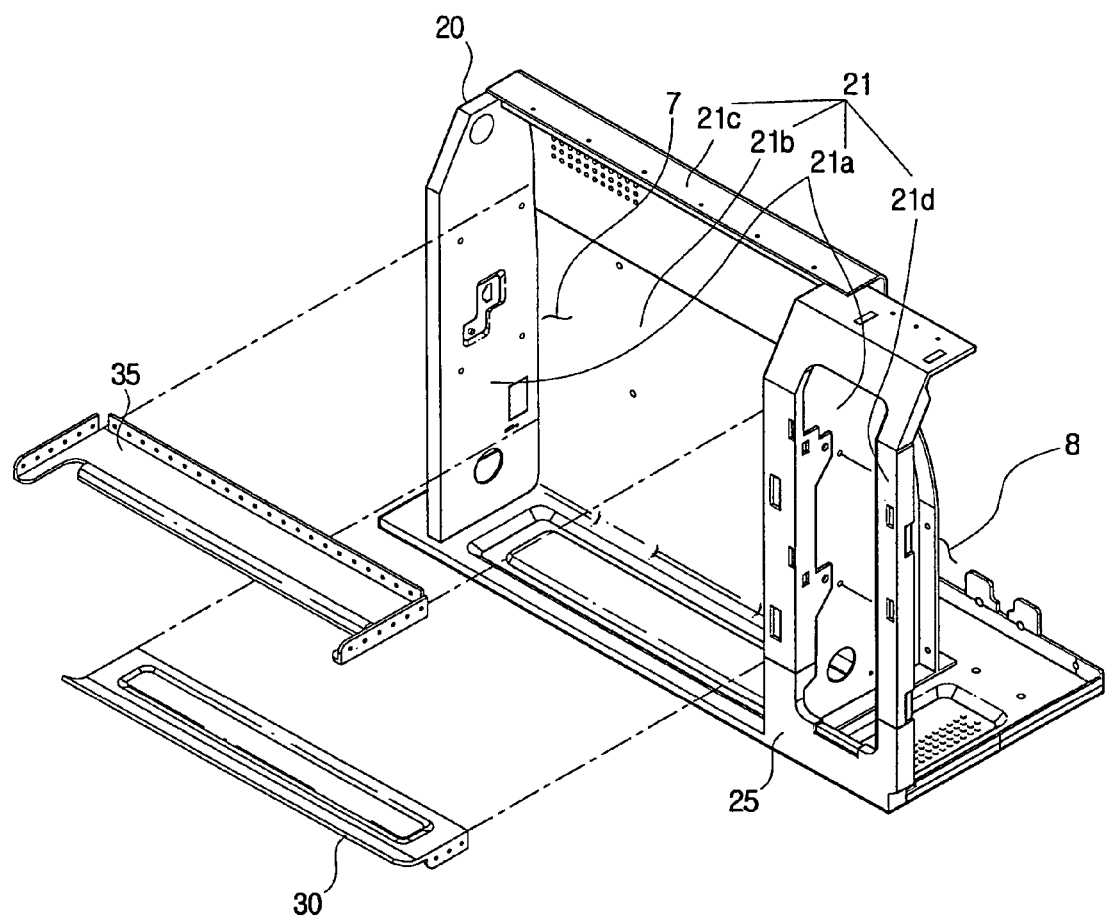
FIG. 3 is a perspective view of the frame of the bread maker of FIG. 2, where a reinforcing member and an auxiliary reinforcing member are separated from the frame.

As shown in FIGS. 1 through 3, a bread maker according to an aspect of the present invention comprises a main body 1 partitioned into an oven compartment 7, in which an oven 5 is accommodated, and a component compartment 8, in which various electronic components (not shown) are accommodated. Further provided are a door 3 in the front of the main body 1 to allow opening and closing of a front opening of the oven compartment 7, a pair of kneading drums 11 disposed in parallel and apart from each other in upper and lower sides of the oven compartment 7, and a drum driving part (not shown) driving the kneading drum 11 to alternate a winding rotation and an unwinding rotation. A control panel 15 is also provided in the front of the component compartment 8 to allow a user to control the bread maker and to display an operating state of the bread maker.

The main body 1 includes a frame 20 forming the oven compartment 7 and the component compartment 8, and a frame cover 13 provided to the outside of the frame 20.

The oven compartment 7 accommodates the oven 5. Further, towards the upper and lower sides of the oven 5 is provided the pair of kneading drums 11 on which opposite ends of a mixing bag (not shown) filled with ingredients for the bread are wound, respectively.

The pair of kneading drums 11 is disposed in parallel and alternate the winding and unwinding rotations, in accordance with rotations of each other. Between the kneading drums 11 is provided a dough-blocking member 19 preventing dough from being kneaded in the mixing bag when moving toward the upper kneading drum 11. According to an aspect of the invention, the dough-blocking member 19 is preferably disposed towards the upper side of the oven 5.

Inside the oven 5 is provided a baking tray 17 having a box shape with a top opening to contain the completely kneaded dough. According to an aspect of the invention, the baking tray 17 is preferably made of aluminum, steel, or of other material that has good heat-resisting property.

The door 3 is rotatably combined to the main body 1, thereby allowing selective opening and closing of the front opening of the oven compartment 7.

The frame 20 further comprises a base frame 25 provided towards the bottom of the main body 1, a main frame 21 disposed above the base frame 25 forming the oven compartment 7 with front opening to accommodate the oven 5 therein, and a reinforcing member 30 mounted to the main frame 21 to reinforce the main frame 21.

The base frame 25 is shaped like a plate to allow it to be seated on a horizontal plane such as a table, and supports the main frame 21 and the components combined to the main frame 21, etc.

The main frame 21 is disposed above the base frame 25, and forms the oven compartment 7 and the component compartment 8. The main frame 21 includes left and right frames 21a forming the left and the right parts of the oven compartment 7, a rear frame 21b forming the rear part of the oven compartment 7, an upper bracket 21c forming the upside of the oven compartment 7, and a control panel supporting frame 21d supporting the control panel 15 provided in the front of the component compartment 8. The main frame 21 is preferably combined with the oven 5 accommodated in the oven compartment 7 via screws 9, however, other securing elements and/or techniques may be utilized.

The reinforcing member 30 is mounted to the main frame 21 to reinforce the main frame 21. Preferably, the reinforcing member 30 is disposed below the oven 5 accommodated in the main frame 21, and supports the oven 5 by being in contact with the bottom of the oven 5. Preferably, the reinforcing member 30 is shaped like a plate, and combined to at least one of the left and right frames 21a or the rear frame 21b of the main frame 21. The reinforcing member 30 and the main frame 21 are preferably combined by spot-welding, but may be combined by other combining elements and/or techniques, such as a screw, etc.

Thus, because the main frame 21 is reinforced via the reinforcing member 30, the bread maker according to an aspect of the present invention is secure against high temperature generated in the oven 5, is strong against vibration due to the rotation of the kneading drums 11, and is able to also suppress noise due to the vibration.

Further, because the main frame 21 supports the oven 5, the oven 5 can be more effectively stabilized.

On the other hand, the bread maker according to one aspect of the present invention further comprises at least one auxiliary reinforcing member 35 mounted to the main frame 21.

The auxiliary reinforcing member 35 is disposed above the oven 5 accommodated in the main frame 21 to reinforce the main frame 21. Similar to the reinforcing member 30, the auxiliary reinforcing member 35 is shaped like a plate, and combined to at least one of the left and right frames 21a, or the rear frame 21b of the main frame 21. Here, the auxiliary reinforcing member 35 and the main frame 21 are combined by spot-welding, but may be combined by other combining elements and/or techniques, such as a screw, etc.

Thus, the bread maker according to an aspect of the present invention, in which the main frame 21 is reinforced with both the reinforcing member 30 and the auxiliary reinforcing member 35, is further strengthened.

Meanwhile, a plurality of auxiliary reinforcing member 35 may be mounted to the main frame.

As described above, the bread maker according to the present invention comprises the base frame provided in the main body, the main frame disposed above the base frame and forming the oven compartment with the front opening in which the oven is accommodated, and the reinforcing member mounted to the main frame to reinforce the main frame, thereby not only securely and stably reinforcing the main body but also suppressing noise.

As described above, an aspect of the present invention provides a bread maker in which a main body is securely and stably reinforced, and noise is suppressed. Further, an oven is securely supported.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A bread maker having a main body and a heating system, the main body comprising:
   a base frame provided in the main body;
   a main frame disposed above the base frame to form an oven compartment with a front opening, the oven compartment accommodating an oven and a kneading system to knead dough within the oven compartment; and
   a reinforcing member mounted to the main frame to reinforce the main frame;
   wherein the heating system generates heat in the oven to make bread from the dough, and
   wherein the reinforcing member supports the oven by contacting a bottom of the oven.

2. The bread maker according to claim 1, wherein the reinforcing member is combined to at least one of a left, a right, or a rear side of the main frame.

3. The bread maker according to claim 1, wherein the reinforcing member supports a lower portion of the oven.

4. The bread maker according to claim 1, further comprising at least one auxiliary reinforcing member mounted to the main frame spaced from the reinforcing member.

5. The bread maker according to claim 4, wherein the auxiliary reinforcing member is disposed above the oven.

6. The bread maker according to claim 4, wherein the auxiliary reinforcing member is combined to at least one of the left, the right or the rear side of the main frame.

7. The bread maker according to claim 2, further comprising at least one auxiliary reinforcing member mounted to the main frame spaced from the reinforcing member.

8. The bread maker according to claim 7, wherein the auxiliary reinforcing member is disposed above the oven.

9. The bread maker according to claim 7, wherein the auxiliary reinforcing member is combined to at least one of the left, the right or the rear side of the main frame.

10. A bread maker having a main body and a heating system, the main body comprising:
    a base frame provided in the main body;
    a main frame disposed above the base frame to form an oven compartment with a front opening, the oven compartment accommodating an oven and a kneading system to knead dough within the oven compartment;
    a reinforcing member mounted to the main frame to reinforce the main frame; and
    at least one auxiliary reinforcing member mounted to the main frame spaced from the reinforcing member,
    wherein the heating system generates heat in the oven to make bread from the dough.

11. The bread maker according to claim 10, wherein the auxiliary reinforcing member is disposed above the oven.

12. The bread maker according to claim 10, wherein the auxiliary reinforcing member is combined to at least one of the left, the right or the rear sides of the main frame.

13. A bread maker having a heating system, comprising:
a main frame disposed above a base frame to form an oven compartment and a component compartment, the oven compartment accommodating an oven and a kneading system to knead dough within the oven compartment;
a left frame and a right frame to form a left part and a right part of the oven compartment;
a rear frame to form the rear part of the oven compartment;
an upper bracket to form an upper portion of the oven compartment;
a control panel supporting frame to support a control panel provided in front of the component compartment; and
a reinforcing member mounted to the main frame to reinforce the main frame;
wherein the reinforcing member supports the oven by contacting a bottom of the oven, and wherein the heating system generates heat in the oven to make bread from dough.

14. The bread maker according to claim 13, wherein the main frame is combined with the oven via screws.

15. The bread maker according to claim 13, wherein the reinforcing member is shaped like a plate, and is combined to at least one of a left, a right, or a rear frame of the main frame.

16. The bread maker according to claim 13, wherein the reinforcing member and the main frame are combined by spot-welding.

17. The bread maker according to claim 13, further comprising: at least one auxiliary reinforcing member disposed to the main frame.

18. The bread maker according to claim 17, wherein the at least one auxiliary reinforcing member is shaped like a plate.

* * * * *